United States Patent [19]

Kraus et al.

[11] 3,945,021

[45] Mar. 16, 1976

[54] LIQUID JET RECORDER

[75] Inventors: Helmut Kraus, Erlangen; Siegfried Wiesmuller, Grossgrundlach, both of Germany

[73] Assignee: Siemens Aktiengesellschaft, Erlangen, Germany

[22] Filed: Sept. 30, 1974

[21] Appl. No.: 511,030

[30] Foreign Application Priority Data

Oct. 2, 1973 Germany .......................... 2349482

[52] U.S. Cl. .............................. 346/75; 346/140 R

[51] Int. Cl.[2] ...................... G01D 15/18; B41J 3/04

[58] Field of Search .............................. 346/75, 140

[56] References Cited

UNITED STATES PATENTS

| | | | |
|---|---|---|---|
| 3,416,153 | 12/1968 | Hertz et al. | 346/75 |
| 3,673,601 | 6/1972 | Hertz | 346/75 |

*Primary Examiner*—Joseph W. Hartary

*Attorney, Agent, or Firm*—Haseltine, Lake & Waters

[57] ABSTRACT

A liquid jet recorder having at least one jet nozzle which is connected to a pressure means conduit for the ejection of an electrically-conductive recording liquid onto a recording carrier; having at least one control electrode encompassing the liquid jet which is disintegrating into drops, which is formed of porous material which communicates with a suction conduit for the recording liquid; and a signal source adapted to be switched between the control electrode and the liquid jet for charging of the drops so that the latter mutually repel each other and disintegrate into a vapor cloud adapted to be aspirated into the control electrode. The recorder includes a suction pump, including circuitry which will activate the suction pump prior to the commencement of a recording. In the liquid jet recorder, any possible residues of the recording liquid adhering to the control electrode are aspirated prior to commencement of a recording. Thus, any dirtying of the recording carrier by means of such residues is no longer possible. Delay means may be provided in the novel circuitry whereby, after completion of a recording sequence, the residues of the recording liquid on the control electrode are collected so as to prevent the dirtying of the recording carrier.

3 Claims, 2 Drawing Figures

LIQUID JET RECORDER

FIELD OF THE INVENTION

The present invention relates to a fluid or liquid jet recorder.

DISCUSSION OF THE PRIOR ART

A liquid jet recorder having at least one jet nozzle which is connected to a pressure means conduit for the ejection of an electrically-conductive recording liquid onto a recording carrier; having at least one control electrode encompassing the liquid jet which is disintegrating into drops, which is formed of porous material which communicates with a suction conduit for the recording liquid; and a signal source adapted to be switched between the control electrode and the liquid jet for charging of the drops so that the latter mutually repel each other and disintegrate into a vapor cloud adapted to be aspirated into the control electrode, is described in U.S. Pat. No. 3,416,153. In this liquid jet recorder it is possible to form a linelike image recording, in which the recording jet is modulated in accordance with the image information. The liquid which is absorbed by the control electrode upon the application of a high-voltage between the recording liquid and the control electrode, is again removed by means of a suction pump. Since the control electrode consists of a porous material adapted to receive the recording liquid, the danger is present that, notwithstanding the aspiration of the recording liquid fluid from the end of the control electrode extending towards the recording carrier during the recording sequence, residues of the recording liquid fluid may collect and dirty the recording carrier.

SUMMARY OF THE INVENTION

Accordingly, it is an object of the present invention to provide a liquid jet recorder of the type described, which will assuredly preclude dirtying of the recording carrier by any liquid residues which may be present on the control electrode.

The foregoing object is inventively achieved in that, for the control of the suction pump, there is provided circuitry which will activate the suction pump prior to the commencement of a recording. In the inventive liquid jet recorder, any possible residues of the recording liquid adhering to the control electrode are aspirated prior to commencement of a recording. Thus, any dirtying of the recording carrier by means of such residues is no longer possible.

A particular advantageous embodiment of the invention may be ascertained when delay means are provided in the novel circuitry whereby, after completion of a recording sequence, the residues of the recording liquid on the control electrode are collected so as to prevent the dirtying of the recording carrier.

BRIEF DESCRIPTION OF THE DRAWINGS

Further advantages and details of the invention may be ascertained from the following description of an exemplary embodiment thereof, taken in conjunction with the accompanying drawing; in which.

DETAILED DESCRIPTION

Figure 1:
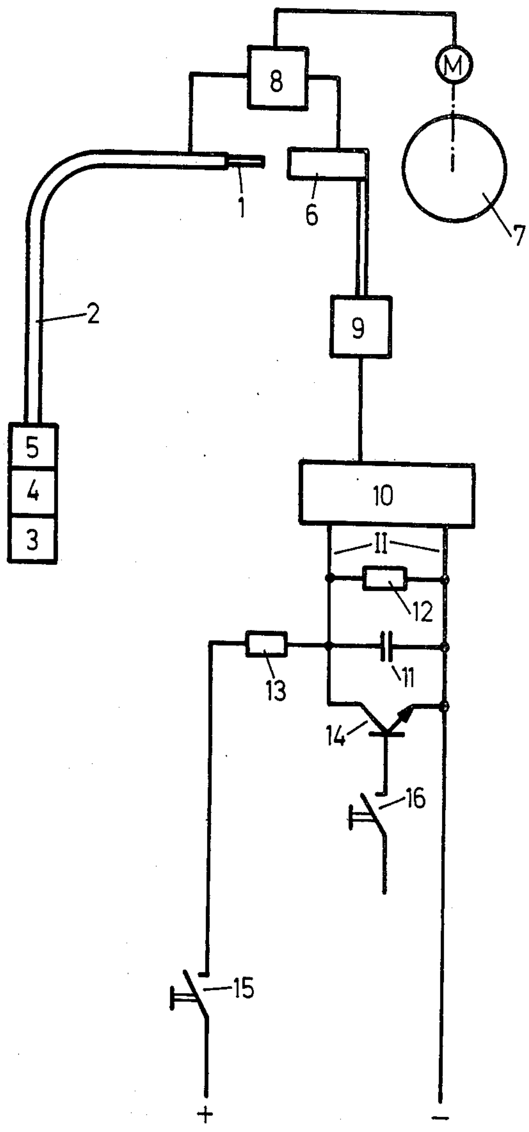
FIG. 1 shows a schematic representation of the liquid jet recorder constructed pursuant to the invention.

In FIG. 1 there is illustrated a jet nozzle 1 which has recording liquid conveyed thereto through a conduit 2. The recording liquid is aspirated from a supply receptacle 3 by means of a pump 4. A pressure regulator 5 provides for a constant or uniform liquid pressure. The liquid jet ejected from the jet nozzle 1 penetrates a control electrode 6 and draws or records an image on a recording carrier which is mounted or stretched on a drum 7.

For this purpose, the drum 7 is rotated and the liquid jet is modulated by means of a control installation 8 in conformance with the image information. The picture is recorded in a linewise manner on the recording carrier which is mounted on the drum 7 when the jet nozzle 1, together with the control electrode is displaced in the longitudinal direction of the drum during the recording sequence, and the drum 7 is rotated in synchronism with the line impulses by the control installation 8. The modulation of the liquid jet is carried out by means of a high-voltage which is applied between the control electrode 6 and the liquid jet in a manner whereby the jet is scanned, in effect meaning, that when a high-voltage is applied the individual drops of the liquid beam mutually repel each other due to the electrical charge and the resultant vapor cloud impinges against the control electrode 6. The control electrode 6 is constituted of a porous material and adapted to aspirate or absorb the vapor cloud. The absorbed recording liquid is then aspirated by a suction pump 9.

The suction pump 9 is controlled by a Schmitt-trigger 10, to the input of which there is connected a condenser circuit incorporating a condenser 11, a discharge resistor 12, a charging resistance 13, and a switching transistor 14. A power supply switch 15 is closed prior to the recording of image for initiating operation of the recorder. The actual image recording only commences when a starter key 16 is actuated.

Figure 2:
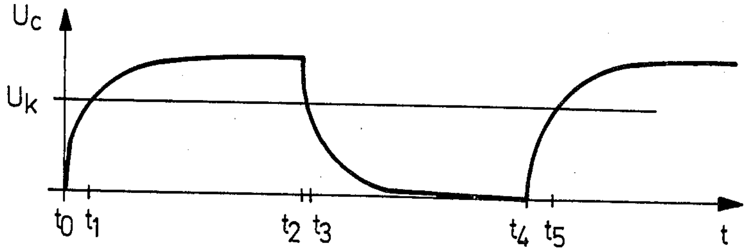
FIG. 2 graphically shows the voltage sequence at the location II of FIG. 1.

The Schmitt-trigger 10 actuates the suction pump 9 when the voltage at the location II lies, pursuant to FIG. 2, below a predetermined value $U_k$.

Should an image recording be assumed, then at first the power supply switch 15 is closed and the recorder connected to the supply voltage. The switching transistor 14 assumes its high-ohmic condition and the condenser 11 is charged through intermediary of the charging resistance 13 in accordance with FIG. 2. At the time point $t_1$ there is reached the oscillating or reversing voltage $U_k$ of the Schmitt-trigger 10. Between the starting time point $t_o$, at which the power supply switch 15 is closed, and the time point $t_1$, the voltage at the input of the Schmitt-trigger 10 lies below the value $U_k$, so that within this time period the suction pump 9 is actuated and the liquid residues present on the control electrode 6 are aspirated. At the time point $t_1$, the Schmitt-trigger reverses and deactivates the suction pump 9. At time point $t_2$, the starter key 16 is actuated, meaning it is closed, and the switching transistor is thereby switched-over into its low-ohmic condition. The condenser 11 now discharges during an image recording sequence through the switching transistor 14, and at time point $t_3$ which, due to the rapidly decreasing condenser voltage, follows closely after the time point $t_2$, the Schmitt-trigger again reverses and again actuates the suction pump 9. The suction pump 9 now remains actuated while the starter key 16 is closed. At time point $t_4$, the image recording sequence is completed. At this time point, the starter key 16 is again opened and the voltage at condenser 11 rises again since the condenser 11 again charges itself through the closed power supply switch 15 and the charging resistance 13. At time point $t_5$, the Schmitt-trigger reverses again and deactuates the suction pump 9. The suction pump is thereby still actuated through time point $t_4$ for a period of time and aspirates any possibly present liquid residues after completion of an image recording. It is thus ascertained that the suction pump 9 is actuated between $t_0$ and $t_1$, as well as $t_3$ and $t_5$, while an image recording sequence is carried out only between $t_2$ and $t_4$.

The described arrangement provides assurance that, prior to a image recording, any possibly present liquid residues are aspirated from the control electrode 6, and after termination of an image recording sequence, there follows a delayed deactuation of suction pump 9, so that the control electrode is cleansed after completion of the image recording. It is essential for the invention that, in addition to the delayed deactuation of the suction pump after an image recording, the suction pump 9 prior to commencement of a recording is actuated upon closing of the power supply switch 15, namely, between $t_0$ and $t_1$.

Within the scope of the invention, prior to commencement of an image recording, the assumed the actuation of the suction pump may also immediately follow the aspirating sequence during an image recording, meaning that the suction pump 9 may be actuated shortly before the beginning of an image recording sequence, and may remain uninterruptedly actuated up to time point $t_5$.

After completion of image recording, or the recording of a plurality of images, the recorder is again deactivated by opening of the power supply switch 15. The condenser 11 then discharges through the discharging resistance 12 so as to be discharged prior to the commencement of a new recording sequence, and the voltage at location II at time point $t_0$ again commences with 0.

While there has been shown what is considered to be the preferred embodiment of the invention, it will be obvious that modifications may be made which come within the scope of the disclosure of the specification.

What is claimed is:

1. In a liquid jet recorder having at least one jet nozzle; a pressure means conduit connected to said jet nozzle for causing the latter to propel a jet of an electrically-conductive recording liquid onto a recording carrier; at least one control electrode formed of a porous material encompassing the liquid jet during disintegration thereof into drops and communicating with suction means for said recording liquid; and a signal source adapted to be applied between said control electrode and said liquid jet for charging said drops so as to mutually repel each other and disintegrate into a vapor cloud absorbed by said control electrode, the improvement comprising: said suction means including a suction pump connected to said control electrode; a control circuit connected to said suction pump for actuating said suction pump prior to commencement of an image recording sequence; and delay means in said control circuit for delaying deactuation of said suction pump subsequent to completion of an image recording sequence.

2. A recorder as claimed in claim 1, wherein said control circuit comprises an oscillating element for actuation of said suction pump, said actuation being effected by said element at a voltage below a predetermined input voltage, a condenser forming a tap-off for the input voltage for said oscillating element, said condenser being chargeable upon closing of a power supply switch and dischargeable by a switch closed during said image recording sequence.

3. A recorder as claimed in claim 1, wherein said control circuit comprises an oscillating element connected to said suction pump for actuation of the latter in response to operation of a power supply switch, said oscillating element transmitting an actuating impulse to said suction pump upon closing of said power supply switch.

* * * * *